US008446672B2

(12) United States Patent
Omi

(10) Patent No.: US 8,446,672 B2
(45) Date of Patent: May 21, 2013

(54) VIBRATION REDUCTION APPARATUS WITH A CENTER OF GRAVITY ADJUSTING MEMBER TO REDUCE DETECTION ERRORS AND OPTICAL APPARATUS

(75) Inventor: Junichi Omi, Yokohama (JP)

(73) Assignee: Nikon Corporation, Tokyo (JP)

( * ) Notice: Subject to any disclaimer, the term of this patent is extended or adjusted under 35 U.S.C. 154(b) by 802 days.

(21) Appl. No.: 12/450,679

(22) PCT Filed: Mar. 28, 2008

(86) PCT No.: PCT/JP2008/056096
§ 371 (c)(1),
(2), (4) Date: Oct. 6, 2009

(87) PCT Pub. No.: WO2008/126702
PCT Pub. Date: Oct. 23, 2008

(65) Prior Publication Data
US 2010/0033820 A1 Feb. 11, 2010

(30) Foreign Application Priority Data
Apr. 9, 2007 (JP) .................................. 2007-101578

(51) Int. Cl.
*G02B 27/64* (2006.01)
(52) U.S. Cl.
USPC ............................................ 359/554; 396/55
(58) Field of Classification Search
None
See application file for complete search history.

(56) References Cited

U.S. PATENT DOCUMENTS

| | | | |
|---|---|---|---|
| 5,266,988 A | 11/1993 | Washisu | |
| 6,064,827 A * | 5/2000 | Toyoda | 396/55 |
| 8,019,210 B2 * | 9/2011 | Uno et al. | 396/55 |
| 2006/0070302 A1 * | 4/2006 | Seo | 52/6 |
| 2006/0072913 A1 * | 4/2006 | Noji | 396/55 |
| 2006/0285838 A1 | 12/2006 | Mashima et al. | |
| 2007/0212046 A1 * | 9/2007 | Sogoh et al. | 396/55 |

FOREIGN PATENT DOCUMENTS

| | | |
|---|---|---|
| JP | 7-168235 | 7/1995 |
| JP | 7-311368 | 11/1995 |
| JP | 9-244089 | 9/1997 |
| JP | 10-39350 | 2/1998 |
| JP | 10-254019 | 9/1998 |
| JP | 2003-057707 | 2/2003 |
| JP | 2006-349953 | 12/2006 |

OTHER PUBLICATIONS

International Search Report for PCT/JP2008/056096, mailed Jun. 17, 2008.
Japanese Office Action issued Jun. 19, 2012 in corresponding Japanese Patent Application No. 2007-101578.
Japanese Office Action issued Dec. 13, 2011 in corresponding Japanese Patent Application No. 2007-101578.
European Search Report dated Nov. 25, 2010 in corresponding European Patent Application 08739214.8.

* cited by examiner

*Primary Examiner* — Arnel C Lavarias

(57) ABSTRACT

A vibration reduction apparatus to stably control the driving of a vibration reduction optical system. A vibration reduction apparatus 30 has a fixed portion 31, a moving portion 25, 32, 34-1, 35-1 having a vibration reduction optical system 25 and moves in a plane perpendicular to an optical axis, relatively with respect to the fixed portion, a first detection portion 35 detects relative movement in a first direction D1 of the moving portion and the fixed portion, a second detection portion detects relative movement in a second direction D2 of the moving portion and the fixed portion, and a center of gravity adjusting member 36 disposed at the moving portion such that a center of gravity position G1 of the moving portion can be brought close to a crossing point C of each detection direction of the first detection portion and the second detection portion.

6 Claims, 6 Drawing Sheets

US 8,446,672 B2

VIBRATION REDUCTION APPARATUS WITH A CENTER OF GRAVITY ADJUSTING MEMBER TO REDUCE DETECTION ERRORS AND OPTICAL APPARATUS

CROSS REFERENCE TO RELATED APPLICATIONS

This application claims the benefit under 35 U.S.C. Section 371, of PCT International Application No. PCT/JP2008/056096, filed Mar. 28, 2008, which claimed priority to Japanese Application No. 2007-101578, filed Apr. 9, 2007, the entire disclosures of which are incorporated by reference as a part of this application.

TECHNICAL FIELD

The present invention relates to a vibration reduction apparatus and an optical apparatus which have a mechanism for correcting optical image blur of an optical system.

BACKGROUND ART

A vibration reduction apparatus is an apparatus which reduces image blur caused by vibrations and the like, by shift-driving in a plane orthogonal to the optical axis a portion of the imaging optical system. As such a vibration reduction apparatus, an apparatus is known where a pair of electromagnetic actuators are disposed separated by 90° about the optical axis of a vibration reduction lens group, and which carry out driving of the lens in their respective directions (for example, refer to Patent Document 1).

The vibration reduction apparatus disclosed in Patent Document 1 is provided with a baffle to mechanically prevent rotation about the center of gravity of a moveable portion to which a lens group for image vibration reduction is fixed. However, such a baffle is mainly a mechanical manufactured product and thus will have microscopic manufacturing errors, and as a result of these errors, is unable to completely suppress rotation of the image vibration reduction lens group. Therefore, the microscopic rotations which could not be completely suppressed destabilize the driving control of the image vibration reduction lens group of the vibration reduction apparatus.

Patent Document 1: Japanese Unexamined Patent Publication No. 2003-57707

DISCLOSURE OF THE INVENTION

Problems to be Solved by the Invention

The problems to be solved by the present invention are to provide a vibration reduction apparatus and optical apparatus which can stably control the driving of a vibration reduction optical system.

Means for Solving the Problems

The present invention solves the above problem by the following means.

A vibration reduction apparatus (30) provided with: a fixed portion (31), a moving portion (25, 32, 34-1, 35-1) having a vibration reduction optical system (25) and which moves in a plane perpendicular to an optical axis of the vibration reduction optical system (25), relatively with respect to the fixed portion (31), a first detection portion (35) which detects relative movement in a first direction (D1) of the moving portion (25, 32, 34-1, 35-1) and the fixed portion (31), a second detection portion (35) which detects relative movement in a second direction (D2) of the moving portion (25, 32, 34-1, 35-1) and the fixed portion (31), and a center of gravity adjusting member (36) disposed at the moving portion (25, 32, 34-1, 35-1) such that a center of gravity position (G1) of the moving portion (25, 32, 34-1, 35-1) can be brought close to a crossing point (C) of each detection direction of the first detection portion (35) and the second detection portion (35).

In another embodiment of the vibration reduction apparatus (30) the center of gravity adjusting member (36) is disposed such that the center of gravity position (G1) of the moving portion (25, 32, 34-1, 35-1) approximately coincides with the crossing point (C) of each detection direction of the first detection portion (35) and the second detection portion (35).

In another embodiment of the vibration reduction apparatus (30), the vibration reduction optical system (25) is disposed such that its optical axis center (OR) coincides with the crossing point (C) of each detection direction of the first detection portion (35) and the second detection portion (35), and with the center of gravity position (G1) of the moving portion (25, 32, 34-1, 35-1).

In another embodiment of the vibration reduction apparatus (30), a first driving portion which relatively moves the fixed portion (31) and the moving portion (25, 32, 34-1, 35-1) in the first direction (D1), and a second driving portion which relatively moves the fixed portion (31) and the moving portion (25, 32, 34-1, 35-1) in the second direction (D2), and wherein the first driving portion and the second driving portion are disposed such that a crossing point (C) of each driving direction of each driving portion is separated by a predetermined distance with respect to the center of gravity position (G1) of the moving portion (25, 32, 34-1, 35-1), and such that the vibration reduction optical system (25) is interposed therebetween.

In another embodiment of the vibration reduction apparatus (30), the first driving portion and the second driving portion are disposed between the first detection portion (35) and the second detection portion (35) and the center of gravity adjusting member (36).

In another embodiment of the vibration reduction apparatus (30), the center of gravity adjusting member (36) is formed of a material having a larger specific gravity than a magnet used for the first detection portion (35) and the second detection portion (35), and/or the first driving portion and the second driving portion.

In another embodiment of the vibration reduction apparatus (30), the center of gravity adjusting member (36) is constituted of a plurality of members.

In another embodiment, an optical apparatus (10) comprises vibration reduction apparatus (30) according to any of the embodiments recited above.

Effects of the Invention

According to the present invention, a vibration reduction apparatus is provided with a center of gravity adjusting member which is disposed at a moving portion, such that the center of gravity position of the moving portion can brought close to the crossing point of each detection direction of the first detection portion and the second detection portion, and thus detection errors of the first detection portion and the second detection portion detected due to rotational motion about the center of gravity of the moving portion can be reduced, and the driving of the moving portion can be stably controlled.

PREFERRED MODE FOR CARRYING OUT THE INVENTION

A more detailed explanation is given below with reference to the drawings and the like, presenting embodiments of the present invention.

Figure 1:
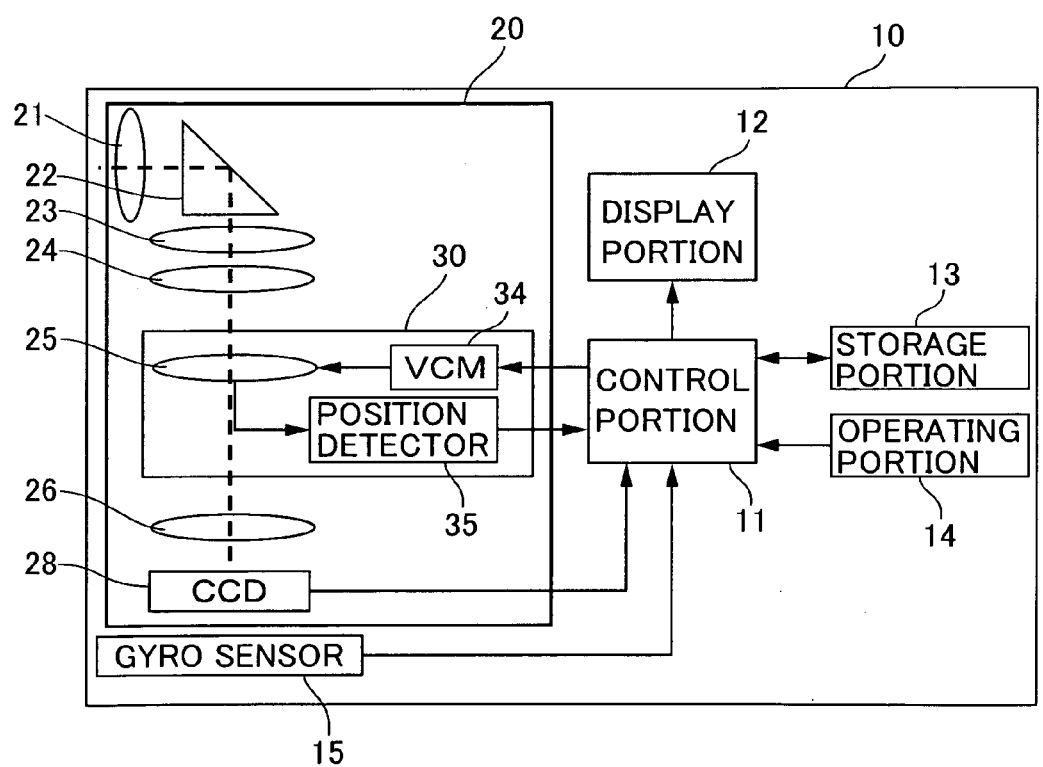
FIG. 1 is a block diagram showing the overall constitution of a camera which is an embodiment of the optical apparatus according to the present invention.
Figure 2:
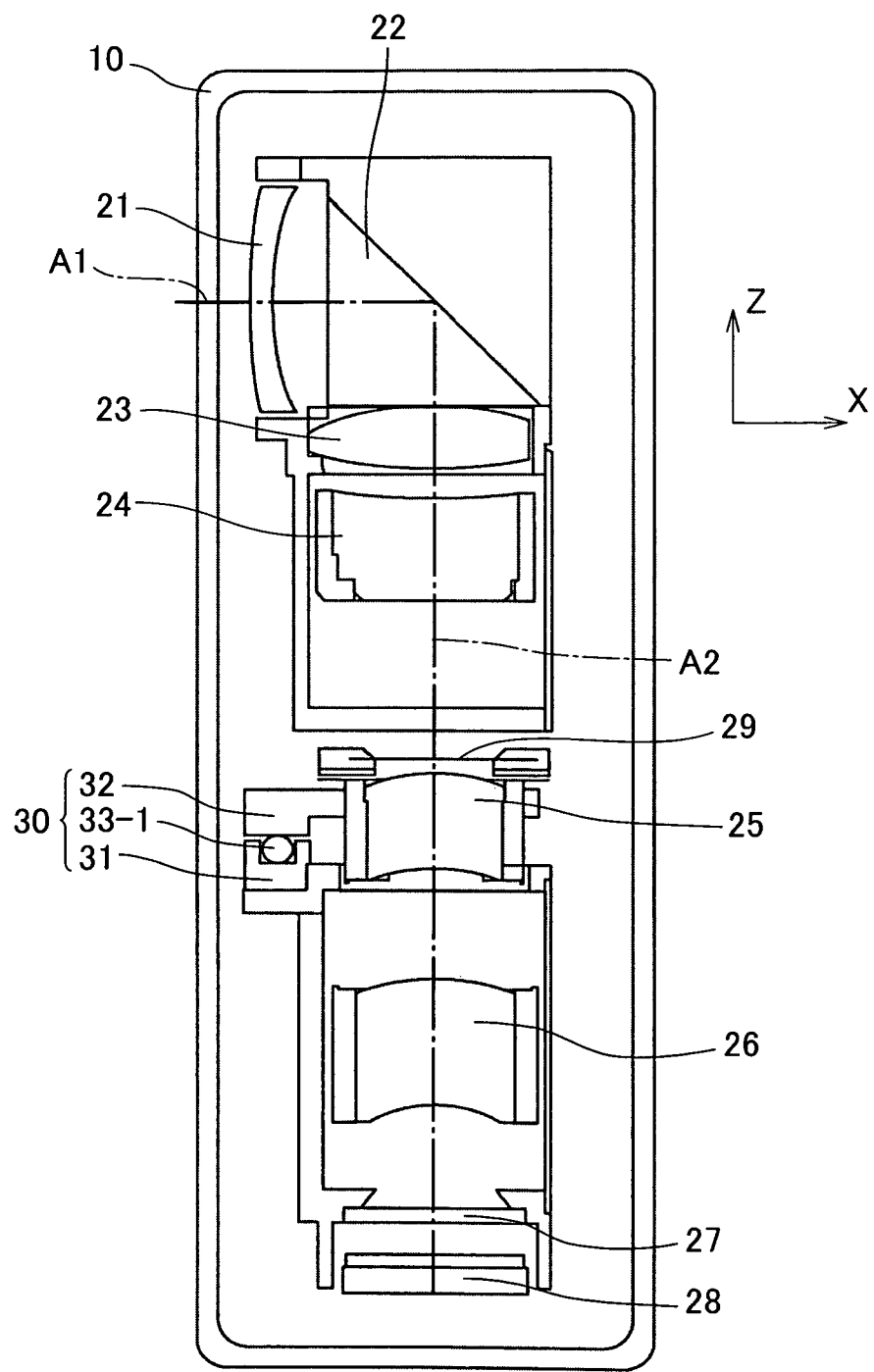
FIG. 2 is a cross sectional drawing showing the lens barrel portion of the camera according to the present invention.

FIG. 1 is a block diagram showing the overall constitution of a camera which is an embodiment of the optical apparatus according to the present invention. FIG. 2 is a cross sectional drawing showing the lens barrel portion of the camera according to the present invention. In order to clarify the explanation, each of the drawings of FIG. 2 and the later described FIGS. 3 to 5 use in common the direction of the ray A1 from the photographic subject as the X axis, and the ray A2 orthogonal thereto as the Z axis. Further, the Y axis is in a direction orthogonal to the X direction and the Z direction.

The camera 10, as shown in FIG. 1, is a digital camera constituted by a control portion 11, a display portion 12, a storage portion 13, an operating portion 14, a gyro sensor 15, and a lens barrel portion 20.

The control portion 11 is a CPU which controls and oversees each portion of the camera 10, and further, also has the function of controlling the vibration reduction mechanism portion 30 in response to an output signal of the gyro sensor 15 and the position detector 35 of the vibration reduction mechanism portion 30 provided at the later explained lens barrel portion 20.

The display portion 12 is a liquid crystal display which displays the operation contents, and the images photographed by the camera 10.

The storage portion 13 is a memory which stores the image data photographed by the camera 10 and the operation settings.

The operating portion 14 is a plurality of buttons for operating, including a release switch for executing the operation of photography and the setting of the photographic conditions and the like of camera 10. For example, it can carry out the operation of the later explained shutter aperture diaphragm portion 29 (refer to FIG. 2), and the zoom operation of driving the later explained third lens group 24 and the fifth lens group 26 (refer to FIG. 2) and the like.

The gyro sensor 15 is a sensor which detects movement of the camera 10 (hand shaking vibrations) in terms of angular velocity. The gyro sensor 15 detects hand shaking vibrations imparted to the camera 10 at the time of photographing, and based on the detected value, drives the vibration reduction mechanism portion 30 provided in the later described lens barrel portion 20, and corrects image blur caused by the hand shaking vibrations. Further, the gyro sensor 15 is constituted of two angular velocity sensors, and each of these angular velocity sensors detects the angular velocity of the pitching (rotation about the Y axis) and yawing (rotation about the Z axis) of the camera 10.

The lens barrel portion 20, as shown in FIG. 1 and FIG. 2, has a first lens group 21, a prism 22, a second lens group 23, a third lens group 24, a fourth lens group 25, a fifth lens group 26, a low pass filter 27, a CCD 28, a shutter aperture diaphragm mechanism portion 29, and a vibration reduction mechanism portion 30.

The first lens group 21 is an objective lens on which the ray A1 from the photographic subject is incident, and is the lens group closest to the photographic subject among the lens groups in the lens barrel portion 20.

The prism 22 is a right angle prism which bends the direction of the incident ray A1 by a 90° angle, fully reflecting the ray A1 in the +X direction outgoing from the first lens group 21, bending it 90°, and outputs it to the second lens group 23 as ray A2 in the −Z direction.

The second lens group 23 is disposed at a position where the ray A2 outgoing from the prism 22 is incident.

The third lens group 24 is disposed at a position where the ray A2 outgoing from the second lens group 23 is incident, and can be moved along the Z direction by a driving mechanism which is not shown.

The fourth lens group 25 is disposed at the moveable frame 32 of the later described vibration reduction mechanism portion 30 and is provided at a position where the ray A2 outgoing from the third lens group 24 is incident.

The fifth lens group 26 is disposed at a position where the ray A2 outgoing from the fourth lens group 25 is incident, and in the same way as the third lens group 24, can be moved along the Z direction by a driving mechanism which is not shown.

The low pass filter 27 is provided between the fifth lens group 26 and the CCD 28, and is a crystalline birefringent plate which removes high frequency components from the ray A2 outgoing from the fifth lens group 26, and outputs it to the CCD 28, and prevents the occurrence of interference fringes (Moire) in the photographic subject image.

The CCD (charge coupled apparatus) 28 is a solid state image sensor onto which the light ray A2 outgoing from the low pass filter 27 is incident, and based on the incident light ray A2, it can convert a photographic subject image to an electronic image signal.

The shutter aperture diaphragm mechanism portion 29 is provided at the incident side of the fourth lens group 25 of the vibration reduction mechanism portion 30, and is provided with an aperture portion which regulates the intensity of the photographic subject light passing through the lens barrel portion 20, and a shutter portion which adjusts the exposure time of exposing the photographic subject light on the CCD 28.

The vibration reduction mechanism portion 30 is provided between the third lens group 24 and the fifth lens group 26, and is a mechanism which drives the fourth lens group 25 in a plane orthogonal to the optical axis of the ray A2, and reduces image blur caused by movement (hand shaking vibrations) caused by movement of the camera 10.

Figure 3:
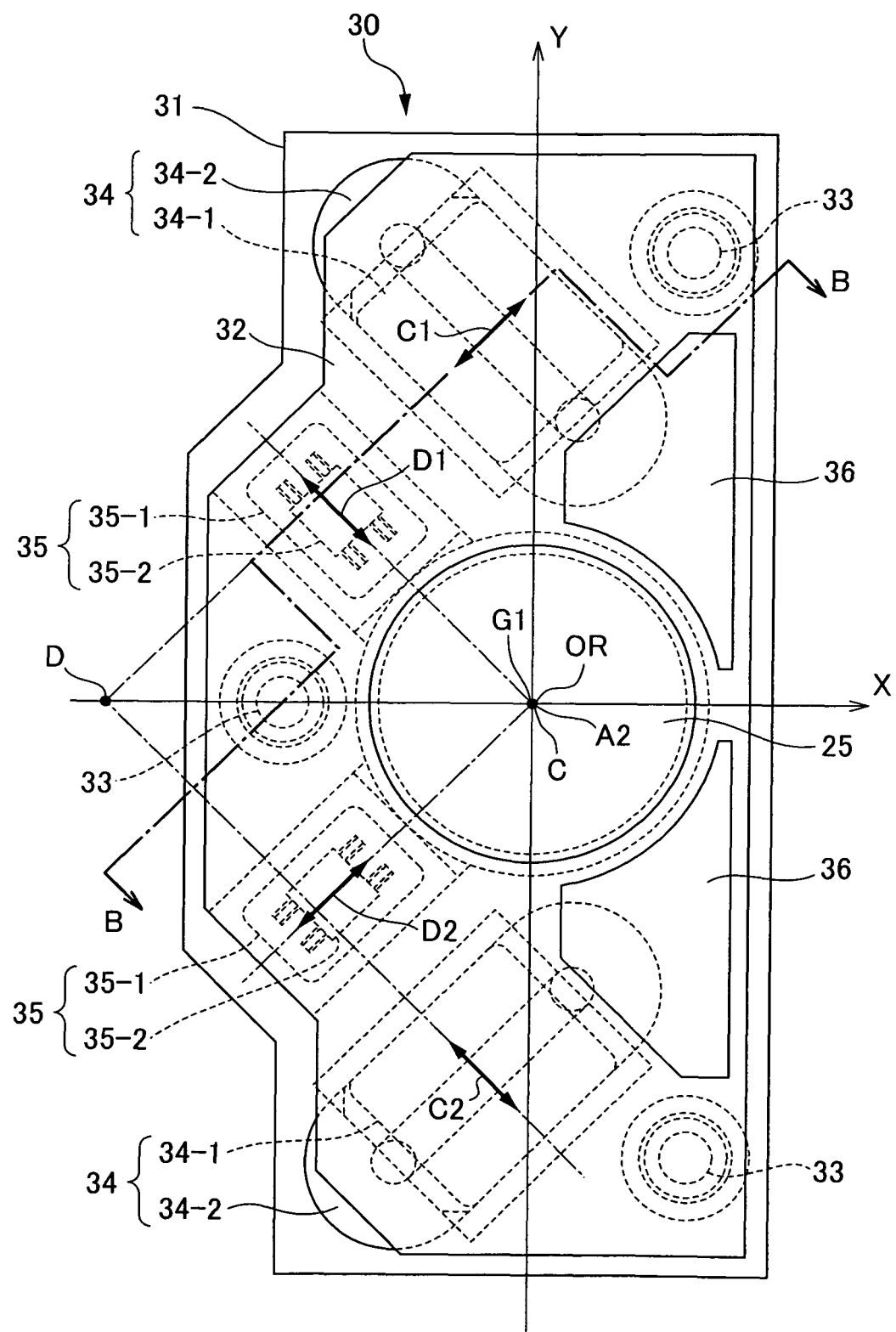
FIG. 3 is a top view of the vibration reduction mechanism portion provided in the lens barrel portion of the camera of the present invention.

Next, the details of the vibration reduction mechanism portion 30 of the camera 10 are explained. FIG. 3 is a top view showing the vibration reduction mechanism portion 30 provided in the lens barrel portion 20. Further, FIG. 4 is a drawing showing the B-B cross section of FIG. 3.

Figure 4:
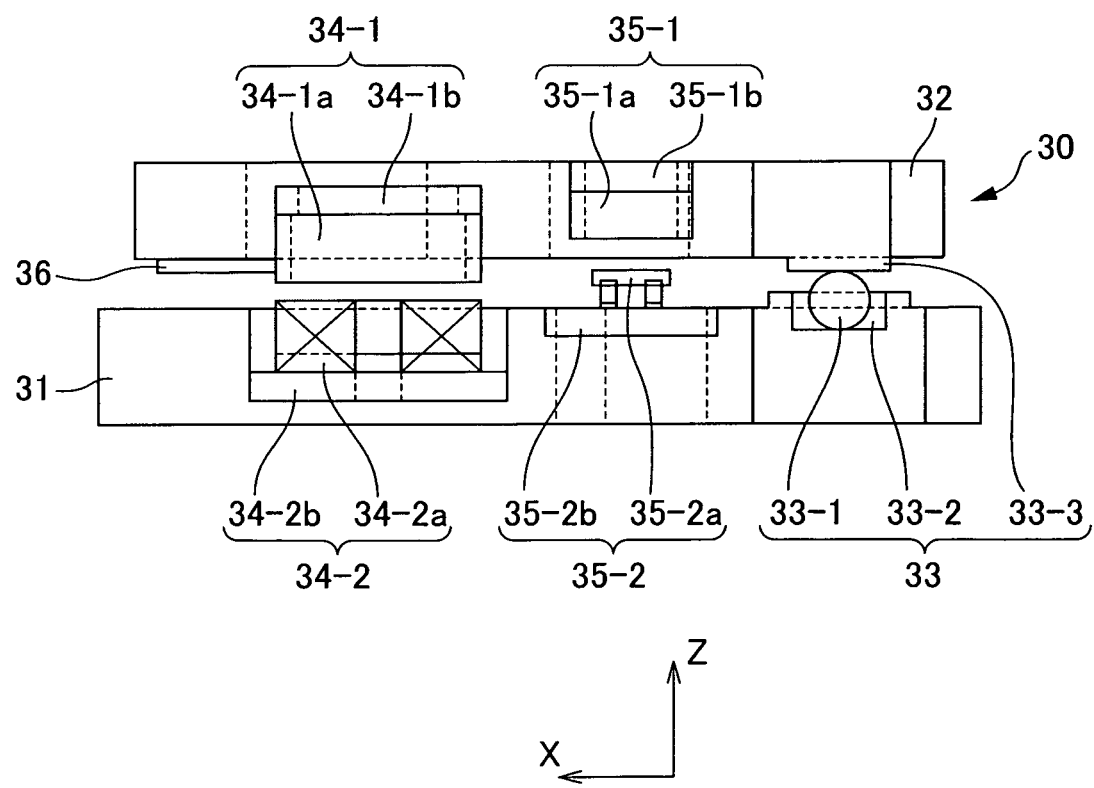
FIG. 4 is a drawing showing the cross section B-B of FIG. 3.

The vibration reduction mechanism portion 30, as shown in FIG. 3 and FIG. 4, has a fixed frame 31, a moveable frame 32, a support portion 33, a VCM (voice coil motor) 34, a position detector 35 and a balancer 36. The vibration reduction mechanism portion 30 drives the VCM 34 based on the detection values of the gyro sensor 15 and the position detector 35, and by moving the fourth lens group 25 fixed to the moveable frame 32 relatively with respect to the fixed frame 31 in a plane orthogonal to the optical axis of the ray A2 (the XY plane), can reduce image blur caused by movement (hand shaking vibrations) of the camera 10. Specifically, the vibration reduction mechanism portion 30, based on the detection value of the gyro sensor 15, carries out control reducing the image blur caused by movement (hand shaking vibrations) of the camera 10, and with the position detector 35, controls the relative positions of the fourth lens group 25 fixed to the moveable frame 32 and the fixed frame 31.

The fixed frame 31 is provided with a hole for passing the ray A2 outgoing from the fourth lens group 25 in its center portion, and is a fixed member which is fixed to the lens barrel portion 20. Further, at the periphery of the hole of the face (front face) of the +Z direction side of the fixed frame 31, the later explained coil portion 34-2 of the VCM 34, and the detector portion 35-2 of the position detector 35 are provided.

The moveable frame 32 is a member which is moveable in the XY plane, with the fourth lens element 25 fixed to its center, and moves relatively with respect to the fixed frame 31. Further, at the periphery of the fourth lens group 25 of the face (hereafter, rear face) of the −Z direction side of the moveable frame 32, the later explained magnet portion 34-1 of the VCM 34, and the magnet portion 35-1 of the position detector 35 are disposed.

The support portion 33, as shown in FIG. 4, is a rolling mechanism constituted of a steel ball 33-1, a ball receiving portion 33-2 hollowed in the form of a cup, and a level portion 33-3, and is disposed at three places between the fixed frame 31 and the moveable frame 32, so as to surround the fourth lens group. The support portion 33, by the ball receiving portion 33-2 provided at the front face of the fixed frame 31, and the level portion 33-3 provided at a position facing the ball receiving portion 33-2, on the rear face of the moveable frame 32, moveably holds the steel ball 33-1. By this mechanism, the moveable frame 32, while being maintained at a fixed position in the Z direction with respect to the fixed frame 31, can be freely moved in the XY plane.

The VCM 34, as shown in FIG. 3, has a magnet portion 34-1 and a coil portion 34-2, and is a non-contact type electromagnetic actuator which can respond with high speed. The VCM 34 is disposed between the position detector 35 and the balancer 36, and is provided at two locations with linear symmetry with respect to the X axis which passes through the center OR of the fourth lens group 25, and its driving directions (arrow C1 and arrow C2) are inclined by 45° with respect to the X direction. Further, the crossing point D of each of the driving directions (arrow C1 and arrow C2) of the VCM 34 is disposed to be on the X axis which passes through the center OR of the fourth lens group 25. By the above disposition, the VCM 34 can relatively move the moveable frame 32 in the XY plane with respect to the fixed frame 31.

The magnet portion 34-1 is a magnetic circuit having a permanent magnet 34-1a and a yoke 34-1b, and is disposed at the rear face of the moveable frame 32.

The coil portion 34-2 is a magnetic circuit having a coil 34-2a which is an armature coil and a yoke 34-2b, and is disposed at a position facing the magnet portion 34-1 of the moveable frame 32, at the front face of the fixed frame 31. The coil portion 34-2, by making a given electric current flow in the coil 34-2a positioned in the magnetic field between the coil portion 34-2 and the magnet portion 34-1 disposed at a facing position, generates a driving force of the VCM 34.

The position detector 35 is constituted by a magnet portion 35-1 and a detector portion 35-2, and is a detector for detecting motional changes of position of the moveable frame 32 by detecting a change in the magnetic field between the magnet portion 35-1 and the detector portion 35-2. The position detector 35 is provided at two locations with linear symmetry with respect to the X axis which passes through the center OR of the fourth lens group 25, and its detection directions (arrow D1 and arrow D2) are inclined by 135° with respect to the X direction. Further, the crossing point (control center C) of each of the detection directions (arrow D1 and arrow D2) is disposed to coincide with the center OR of the fourth lens group 25. By the above disposition, the position detector 35 can detect the position in the XY plane of the center OR of the fourth lens group 25 fixed to the moveable frame 32.

The magnet portion 35-1 is a magnetic circuit having a permanent magnet 35-1a and a yoke 35-1b, and is disposed at the rear face of the moveable frame 32.

The detector portion 35-2 has a Hall element 35-2a and a yoke 35-2b, and is disposed at a position facing the magnet portion 35-1 of the moveable frame 32, at the front face of the fixed frame 31. The detector portion 35-2 detects changes in the magnetic field due to a movement amount of the moveable frame 32 by the Hall element 35-2a positioned in the magnetic field between the detector portion 35-2 and the magnet portion 35-1 disposed at a facing position.

The balancer 36 is a weight member divided into two parts, which are respectively disposed between the magnet portions 34-1 of the two VCM's 34 provided at the rear face of the moveable frame 32, and the fourth lens group 25, and makes the position of the center of gravity G1 of the fixed frame 32 to which the magnet portion 34-1 of the VCM 34, the magnet portion 35-1 of the position detector 35 and the fourth lens group 25 are fixed, coincide with the center OR of the fourth lens group 25 and the control center C of the position detector 35. The balancer 36, by making the above center of gravity G1, the control center C of the position detector 35, and the position of the center OR of the fourth lens group 25 coincide, allows stable control of the vibration reduction mechanism portion 30.

The balancer 36 is formed of a material having a larger specific gravity than the permanent magnet 34-1a of the VCM 34 and the permanent magnet 35-1a of the position detector 35, for example tungsten, which allows the balancer 36 to be efficiently disposed in a limited space of the moveable frame 32.

Next, the changes in the center of gravity position by disposing the balancer 36 at the moveable frame 32 will be explained. FIG. 5 is a drawing showing the change in the center of gravity position by disposing the balancer 36 at the moveable frame 32. Herein, in order to clarify the explanation, the moveable frame 32 in the state in which the magnet portion 34-1 of the VCM 34, the magnet portion 35-1 of the position detector 35, and the fourth lens group 25 are fixed thereto is called the moving portion.

Figure 5B:
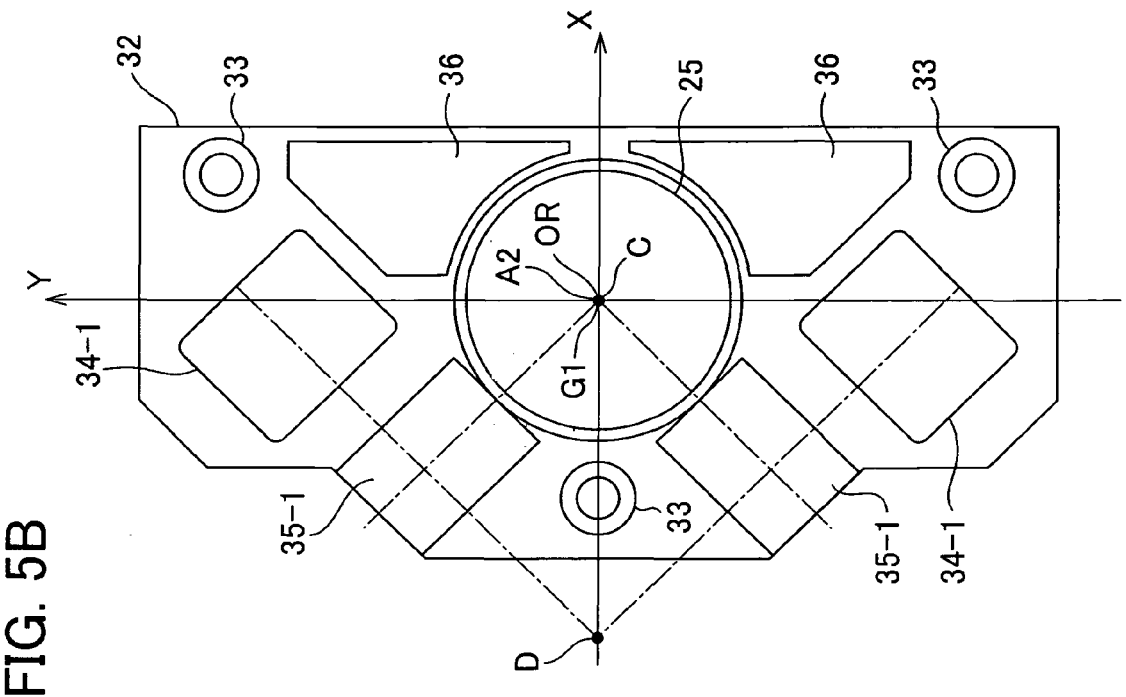
FIGS. 5A and 5B are a drawing showing the change in the center of gravity position resulting from disposing the balancer at the moveable frame of the vibration reduction mechanism.
Figure 5A:
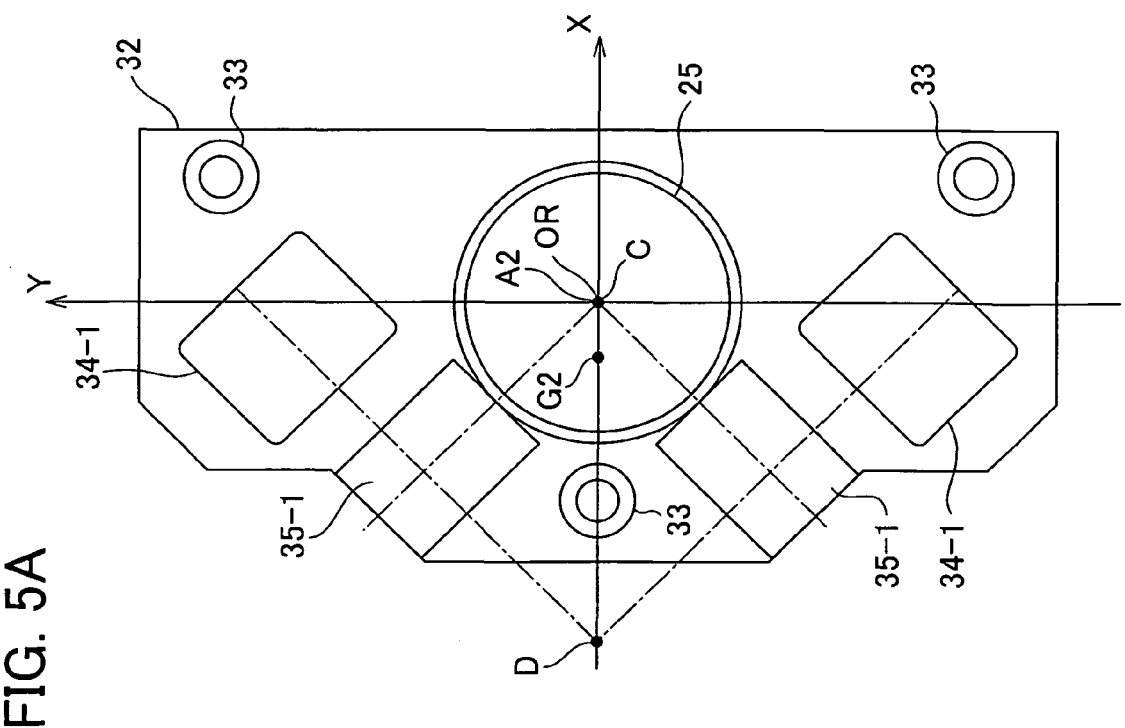

In the moving portion, the magnet portion 34-1 of the VCM 34 and the magnet portion 35-1 of the position detector 35 on the moveable frame 32 are disposed more towards the −X direction side than the center OR of the fourth lens group 25, and therefore when the balancer 36 is not provided, as shown in FIG. 5A, the position of the center of gravity G2 of the moving portion is at a position further towards the −X direction side than the center OR of the fourth lens group 25.

In order to make the center of gravity G2 of the moving portion positioned at the −X direction side coincide with the control center C of the position detector 35 and the center OR of the fourth lens group 25, it is necessary to dispose the balancer 36 further towards the +X direction than the center OR of the fourth lens group 25, and in the present embodiment, as shown in FIG. 5B, it is disposed between the magnet portions 34-1 of the two VCM's 34, and the fourth lens group 25. By disposing the balancer 36, the center of gravity position of the moving portion changes from G2 to G1.

Next, the positional relationship between the center of gravity position of the moving portion and the control center C of the position detector 35 and the effect on the control characteristics of the vibration reduction mechanism portion 30 are explained. FIG. 6 is a drawing explaining the relationship between the positions of the center of gravity of the moving portion and the control center of the position detector, and the detection errors of the position detector.

Figure 6A:
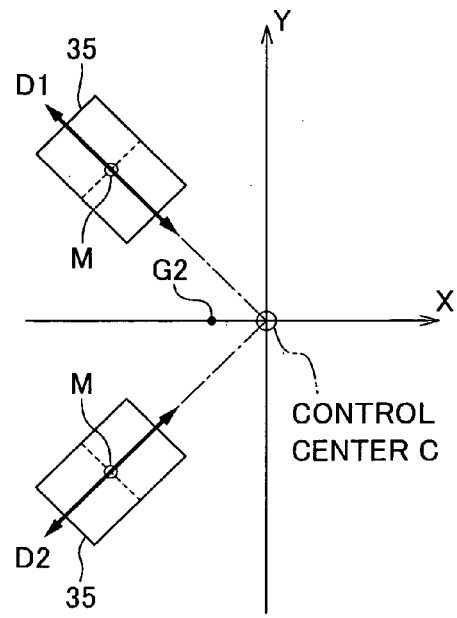
FIGS. 6A-6D are a drawing explaining the relationship between the positions of the center of gravity of the moving portion of the vibration reduction mechanism portion, the control center of the position detector, and detection errors of the position detector.
Figure 6B:
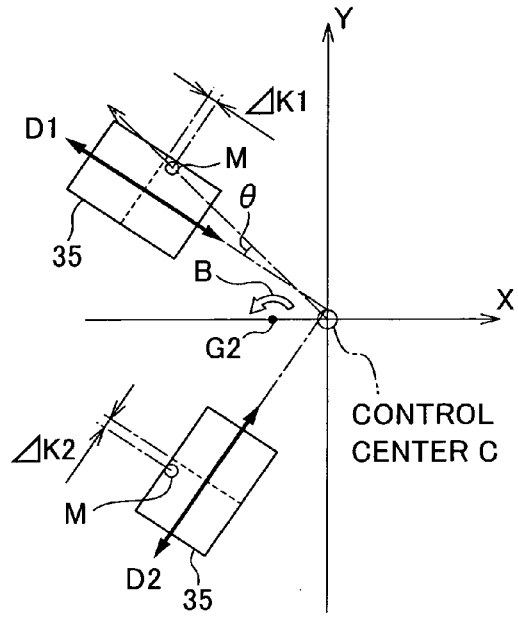

The magnet portion 34-1 of the VCM 34 and the magnet portion 35-1 of the position detector 35 provided on the moving frame 32, as explained above, are disposed further along the −X direction than the center OR of the fourth lens group 25 and thus, if the balancer 36 is not provided at the moving portion (refer to FIG. 5A), as shown in FIG. 6A, the position of the center of gravity G2 of the moving portion will be further along the −X direction than the control center C of the position detector 35. Because of this, as shown in FIG. 6B, when the moving portion rotates by a rotation amount θ about the center of gravity G2 (arrow B), the position detector 35 will detect the detection errors ΔK1 and ΔK2 at the detection point M of the Hall element 35-2a of the detector portion 35-2 fixed to the fixed frame 31. These detection errors ΔK1 and ΔK2 are detected in the detection directions (D1 and D2) even if there is no translational movement and thus, they become a factor in the reduction of the accuracy of the vibration reduction control of the vibration reduction mechanism portion 30. For example, if the rotation amount θ is 0.7°, the distance from the control center C to the detection point M is 7 mm, and the distance from the center of gravity G2 to the control center C is 1 mm, the detection errors ΔK1 and ΔK2 are approximately 9.2 μm, and this contributes to the unstable factors in the vibration reduction control system.

Figure 6C:
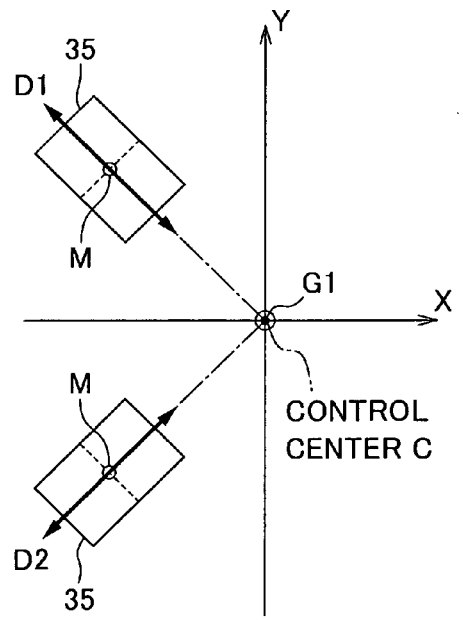
Figure 6D:
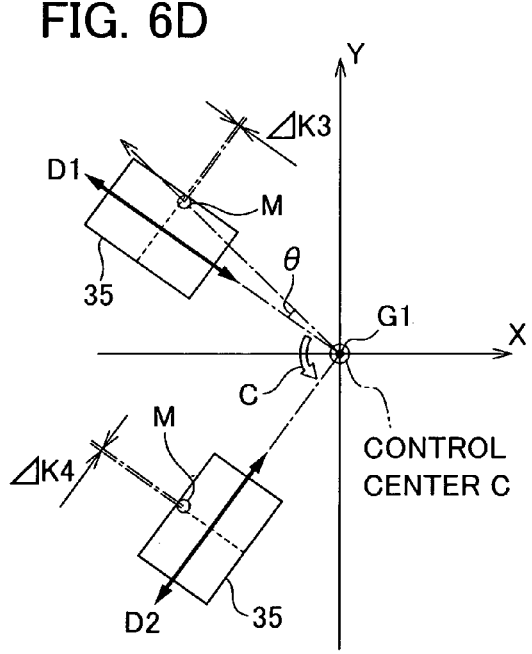

As explained above, in the present embodiment, by disposing the balancer 36 at the moving portion (refer to FIG. 5B), as shown in FIG. 6C, the center of gravity G1 of the moving portion and the control center C of the position detector 35 are made to coincide, thus the above detection errors are reduced. In this case, if the moving portion, as shown in FIG. 6D, rotates by the rotation amount θ (arrow C) about the center of gravity G1, the position detector 35 will detect the detection errors ΔK3 and ΔK4 but these are very small and have almost no effect on the control system of the vibration reduction mechanism portion 30. For example, if the rotation amount θ is 0.7°, the distance from the control center C to the detection point M is 7 mm, the detection errors ΔK3 and ΔK4 are about 0.5 μm, which is a very small amount with respect to the above described detection errors ΔK1 and ΔK2, which prevents instability in the vibration reduction control.

Further, in the present embodiment, not only do the center of gravity G1 of the moving portion and the control center C coincide, but also, the center OR of the fourth lens group 25 also coincides with these, thus it is possible to prevent changes in the characteristics of the ray A2 passing through the fourth lens group 25 even if the moving portion rotates about the center of gravity G1.

From the above, the camera of the present embodiment has the following effects.

(1) In the vibration reduction apparatus, in order to make the position of the center of gravity G1 of the moving portion coincide with the control center C of the position detector 35, the balancer 36 disposed at the moving portion is provided, and thus it is possible to reduce detection errors of the position detector 35 due to detection of rotational movement by rotation of the center of gravity G of the moving portion; and it is possible to stabilize the driving of the moving portion and to carry out control with good accuracy.

(2) For the fourth lens group 25, the center OR is disposed so as to coincide with the position of the control center C of the position detector 35 and the center of gravity G1 of the moving portion and thus, it is possible to prevent changes in the characteristics of the photographic subject light passing through the fourth lens group 25 even if the moving portion rotates in the XY plane.

(3) The VCM 34 is disposed between the position detector 35 and the balancer 36 and thus, it is possible to match the position of the center of gravity G1 of the moving portion with the position of the control center C of the position detector 35.

(4) The balancer 36 is formed of tungsten which has a larger specific gravity than the magnet used for the magnet portion 34-1 of the VCM 34 and the magnet portion 35-1 of the position detector 35 and thus, the balancer 36 can be formed to have a smaller shape than that of the magnets, and the degree of freedom in the design of the vibration reduction mechanism portion 30 is improved, and thus it is possible to easily later add the balancer 36 to an existing moveable frame 32.

(5) The balancer 36 is divided into two parts and thus, the balancer 36 can be efficiently disposed with respect to the open space of the moveable frame 32.

Modifications

Without being limited to the above explained embodiments, many modifications and variations are possible, and these are equally within the scope of the present invention.

(1) In the present embodiment, tungsten was used for the balancer 36, but other materials, for example brass, may also be used. Further, depending on the amount of displacement between the position of the control center C and the position of the center of gravity G1, it is possible to form the balancer 36 of a material having a lower specific gravity than the magnet.

(2) In the present embodiment, the VCM 34 and the position detector 35 are respectively disposed on the moveable frame 32 at angles of 45° and 135° with respect to the X and Y axis, but other dispositions are possible, for example, they may be respectively disposed on the X and Y axes.

(3) In the present embodiment, the balancer 36 is provided on the moveable frame 32 in order to make the position of the center of gravity G1 of the moving portion coincide with the control center C of the position detector, but it is also possible to provide the balancer 36 at the movable frame 32 such that the position of the center of gravity G1 of the moving portion is brought close to the control center C of the position detector 35. In this case, the detection errors detected by the position detector 35 will become larger than the detection errors ΔK3 and ΔK4 of the present embodiment, but they will be smaller than the detection errors ΔK1 and ΔK2 detected for the case of not providing the balancer 36 and thus, it is possible to improve the stability of the of the control system of the vibration reduction mechanism portion 30 compared to the state of not providing the balancer 36.

(4) In the present embodiment, the vibration reduction mechanism portion 30 is provided in a lens barrel portion 20 which is an optical system of a folded type, but it may be provided in other forms of optical system, for example an optical system of a camera of a retractable lens type.

The invention claimed is:

1. A vibration reduction apparatus comprising:
a fixed portion,
a moving portion having a vibration reduction optical system and which moves in a plane perpendicular to an optical axis of the vibration reduction optical system, relatively with respect to the fixed portion,
a first detection portion which detects relative movement in a first direction of the moving portion and the fixed portion,
a second detection portion which detects relative movement in a second direction of the moving portion and the fixed portion,
a center of gravity adjusting member disposed at the moving portion such that a center of gravity position of the moving portion is positioned adjacent to a first crossing point of a first detection line extending from the center of the first detection portion along the first detection portion and a second detection line extending from the center of the second detection portion along the second detection direction,
a first driving portion which moves the moving portion relative to the fixed portion in a first movement direction, and
a second driving portion which moves the moving portion relative to the fixed portion in a second movement direction,
wherein a first movement line extending from the center of the first driving portion along the first movement direction and a second movement line extending from the center of the second driving portion along the second movement direction do not pass through an optical center,
a second crossing point of the first movement line and the second movement line is separated by a predetermined distance with respect to the center of gravity of an optical center along a first line,
the first driving portion is disposed between the first detection portion and the center of gravity adjusting member,
the second driving portion is disposed between the second detection portion and the center of gravity adjusting member, and
a part of the first driving portion and a part of the second driving portion are disposed on a second line perpendicular to the first line, with the vibration reduction optical system interposed therebetween.

2. The vibration reduction apparatus according to claim 1, wherein
the center of gravity adjusting member is disposed such that the center of gravity position of the moving portion coincides with the first crossing point.

3. The vibration reduction apparatus according to claim 2, wherein
the vibration reduction optical system is disposed such that its optical axis center coincides with the first crossing point, and with the center of gravity position of the moving portion.

4. The vibration reduction apparatus according to claim 1, wherein
the center of gravity adjusting member is formed of a material having a larger specific gravity than a magnet used for the first detection portion and the second detection portion, or the first driving portion and the second driving portion.

5. The vibration reduction apparatus according to claim 1, wherein
the center of gravity adjusting member is constituted of a plurality of members.

6. An optical apparatus comprising a vibration reduction apparatus according to claim 1.

* * * * *